United States Patent [19]

Nakao et al.

[11] 4,192,962
[45] Mar. 11, 1980

[54] METHOD AND APPARATUS FOR REGENERATING USED ACTIVATED CARBON

[75] Inventors: Kozaburo Nakao, Tokyo; Toru Miyajima, Chigasaki, both of Japan

[73] Assignee: Kabushiki Kaisha Kyoritsu Yuki Kogyo Kenkyusho, Tokyo, Japan

[21] Appl. No.: 907,752

[22] Filed: May 19, 1978

[51] Int. Cl.² .......................... F27B 1/08; E27D 11/04
[52] U.S. Cl. ............................................... 13/7; 13/23
[58] Field of Search ................ 13/7, 23, 25; 252/411; 204/275, 222

[56] References Cited

U.S. PATENT DOCUMENTS

| | | | |
|---|---|---|---|
| 1,071,442 | 8/1913 | Lee | 13/7 |
| 2,270,245 | 1/1942 | Barker | 13/7 |

*Primary Examiner*—Roy N. Envall, Jr.
*Attorney, Agent, or Firm*—Koda and Androlia

[57] ABSTRACT

In a vertical electric furnace having vertically spaced annular electrodes for regenerating used activated carbon by passing electric current therethrough, the inner cross-sectional area of the furnace is gradually decreased and then gradually increased between the electrodes thus forming a throat. With this construction, layers of the used activated carbon in which the resistance value varies with the temperature gradient are formed.

2 Claims, 2 Drawing Figures

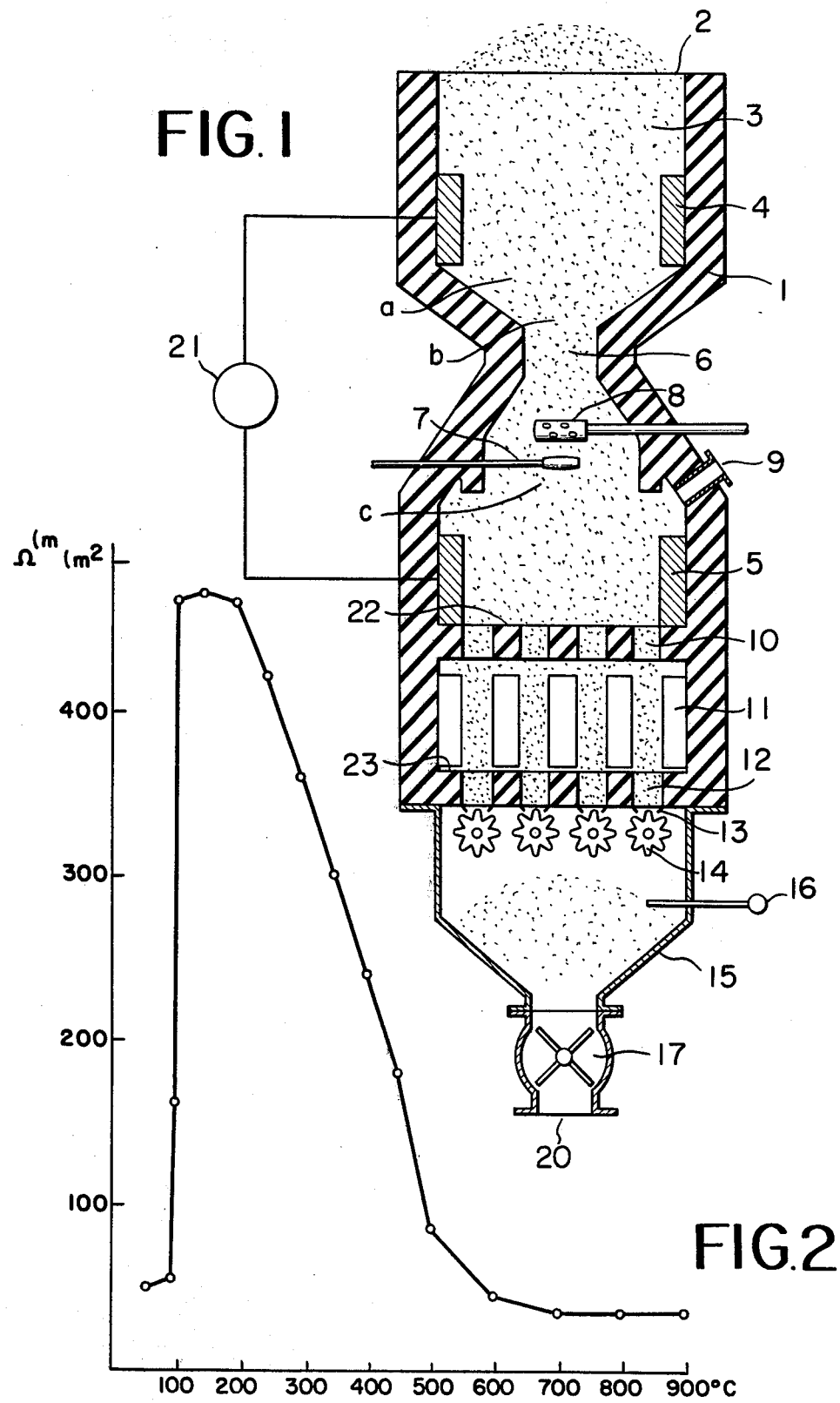

METHOD AND APPARATUS FOR REGENERATING USED ACTIVATED CARBON

BACKGROUND OF THE INVENTION

This invention relates to a method and apparatus for regenerating used activated carbon, and more particularly to a method and apparatus for controlling the electrical resistance of the layers of used activated carbon to be regenerated when it is heated and regenerated by passing electric current therethrough in an electric furnace.

Due to shortage of industrial water, especially waste water is purified by the adsorption function of activated carbon for the purpose of reusing the purified water. However, as activated carbon is expensive, it is desirable to efficiently regenerate used activated carbon which has adsorbed impurities during the purification of water.

To regenerate used activated carbon it is necessary to heat it at a temperature of from 400° to 800° C. or more and to cause it to contact with steam. According to one prior art method of regeneration, the used activated carbon was contacted with hot combustion gas. However, with this method, a portion of the activated carbon is lost by combustion so that it is necessary to supplement the lost portion with fresh activated carbon and a substantial portion of the running cost of the water purifying apparatus, in an extreme case more than one half of the cost, is occupied by the cost of supplementing the fresh activated carbon. Especially, in the case of a small capacity furnace this tendency is remarkable so that this method is not efficient where such small quantity of used activated carbon is to be regenerated which has been used for the treatment of ordinary waste water.

As a result of our research we have found that the electrical resistance of used activated carbon varies with time in the following manner when it is regenerated by the passage of electric current.

THE FIRST STEP

As the surface of the activated carbon is wetted with water, during the first step, current flows through wet water. Accordingly, the electrical resistance of the activated carbon is low during the initial stage of regeneration but increases with time as the water evaporates. During the first step the temperature inside of the activated carbon layer is lower than about 100° C.

THE SECOND STEP

During this step, the electrical resistance rises to a high value, since the water on the surface of the activated carbon has already been evaporated and since the surface of the activated carbon is covered by adsorbed impurity having a high resistivity.

The temperature in the activated carbon layer at the second step is about 100°–300° C.

THE THIRD STEP

During this step, the adsorbed impurity is decomposed and carbonized by heat so that the electrical resistance decreases as the temperature in the activated carbon layer rises.

The temperature in the activated carbon layer during this step is higher than 600° C.

As above described, since the electrical resistance of the activated carbon layer varies with the regeneration steps and since the variation in the resistance is not uniform depending upon the degree of contamination of the activated carbon caused by impurities, it is necessary to continuously vary the operating voltage in order to regenerate used activated current by passing current therethrough.

According to one prior art proposal, for the purpose of establishing a desired temperature gradient along the axis of a vertical electric furnace two or more pairs of vertically spaced electrodes are provided and different voltages are applied across the electrodes of respective pairs. This complicates the construction of not only the furnace but also of the source.

SUMMARY OF THE INVENTION

Accordingly, it is an object of this invention to provide a novel method and apparatus for regenerating used activated carbon capable of efficiently regenerating the same by automatically establishing a desired temperature gradient in successive layers of the used activated carbon without continuously adjusting the voltage impressed across the electrodes.

A further object of this invention is to provide a novel method and apparatus for regenerating used activated carbon capable of efficiently regenerating used activated carbon with an electric furnace of simple construction and with simplified electric source for operating the furnace.

According to one aspect of this invention there is provided a method of regenerating used activated carbon comprising the steps of continuously charging used activated carbon into a vertical electric furnace through an upper opening thereof, passing electric current through the charged activated carbon substantially in the axial direction of the furnace, forming superposed layers of the used activated carbon in the electric furnace in which the electric resistance value of the used activated carbon varies with a temperature gradient created as a result of passing the electric current, and varying the cross-sectional area of the layers through which the activated carbon passes.

According to another aspect of this invention there is provided apparatus for regenerating used activated carbon comprising a vertical electric furnace provided with an upper opening for charging used activated carbon to be generated, a bottom opening for discharging regenerated activated carbon, and upper and lower generally annular electrodes mounted on the inner wall of the electrode furnace, the electrodes being spaced apart in the vertical direction, the inner cross-sectional area of the furnace gradually decreasing and then gradually increasing between the upper and lower electrodes thus forming a throat for the passage of the activated carbon and a source of electric power for applying operating voltage across the electrodes.

BRIEF DESCRIPTION OF THE DRAWINGS

In the accompanying drawings:

FIG. 1 is a longitudinal sectional view showing an electric furnace utilized in this invention; and FIG. 2 is a graph showing the relationship between the temperature of the activated carbon to be regenerated and the variation in the electric resistance when used activated carbon is regenerated by the furnace shown in FIG. 1.

DESCRIPTION OF THE PREFERRED EMBODIMENT

The electric furnace shown in FIG. 1 comprises a main body 1 fabricated with refractory bricks, unglazed potteries or the like refractory materials and provided with an upper opening 2 for charging used activated carbon 3 to be regenerated and a bottom opening 20 in which a rotary valve 17 is disposed for continuously discharging regenerated activated carbon. At the upper portion and an intermediate portion of the main body 1 are disposed electrodes 4 and 5 for passing electric current through the activated carbon 3 to cause it to generate heat by the own resistance of the particles of the activated carbon and the contact resistance between the particles. Each of the electrodes 4 and 5 may be a continuous annular ring or may be constituted by a number of arcuate electroconductive segments which are disposed along a circle. The heat generated by the activated carbon particles is used to regenerate the used activated carbon in a manner as will be described later.

After charging the used activated carbon through the upper opening 2 to fill the interior of the main body 1, a suitable operating voltage is impressed across the electrodes 4 and 5 from a DC or AC source 21 to pass current through the layer of the activated carbon. Under a steady state, the charged activated carbon 3 forms three layers a, b and c respectively corresponding to the first to third steps or stages described above.

In layer a corresponding to the first step, the water therein is removed and the temperature of the layer is lower than about 100° C.

In layer b corresponding to the second step, the electrical resistance has been increased by the removal of water and its temperature rises to about 100° to 300° C. The entire resistance of the furnace is mainly governed by the resistance of this layer b.

Since the adsorbed impurity has been decomposed and carbonized by the heat generated in the second step, in the layer c corresponding to the third step, regeneration of the used activated carbon proceeds smoothly with an accompanying decrease in the electrical resistance. The temperature in the furnace during this step is higher than 800° C.

According to this invention, the cross-sectional area of the furnace is made minimum at point 6 between the electrodes 4 and 5. More particularly, the cross-sectional area is gradually decreased from layer a toward layer b and then gradually increased toward layer c bounded by the lower electrode 5. In other words, the longitudinal section of the furnace resembles that of an hour glass. The bottom of the furnace is connected with the discharge opening 20 through a funnel shaped hopper 15 to again gradually decrease the cross-sectional area thereby permitting continuous operation.

A steam ejection nozzle 8 is disposed immediately beneath the narrowest portion 6 or the throat of the furnace, and vertical cooling water pipes 11 are disposed between slots 10 and 12 of upper and lower horizontal buffle plates 22 and 23. Discharge guide rings 13 are provided at the lower ends of respective lower slots 12 and rotary dischargers in the form of star wheels 14 driven by a drive source, not shown, are located beneath respective guide rings 13 for continuously transferring regenerated activated carbon into hopper 15. A level indicator 16 is provided for the hopper 15 and a gas discharge opening 9 is located beneath the steam ejection nozzle 8. Thermocouples 7 (only one is shown) are provided to measure the temperature of respective layers.

As above described, the electric resistance of layer b corresponding to the second step is the highest and the overall resistance of the furnace is mainly governed by the resistance value of this layer. According to this invention, the longitudinal section of the furnace is made to resemble that of a hour glass and to cause layer 2 to occupy the portion 6 having the smallest cross-sectional area.

Where the resistance between the electrodes 4 and 5 is too high the discharge speed of the regenerated activated carbon through the bottom opening is decreased so as to shift upwardly layers b and c. Consequently, the thickness of layer b having higher resistance is decreased whereas that of layer c having lower resistance is increased, thus decreasing the overall resistance of the furnace.

On the contrary, when the resistance between electrodes 4 and 5 is too small, the discharge speed through the lower opening is increased to shift the high resistance layer b toward lower thereby increasing the overall resistance.

As above described according to this invention it is possible to control the electrical resistance of the activated carbon being regenerated and hence to regulate the current by varying the cross-sectional area or thickness of the high resistance layer while a constant voltage is being impressed across the electrodes.

Instead of an hour glass configuration, the cross-sectional area of the furnace can be varied as desired as by disposing a conical body in the furnace. Where such inserted body is adjustable in the vertical direction, the operation of the furnace is made to be more flexible.

As an example, the dimensions of various portions of a test furnace are as follows. The diameter of the upper charging opening is 15 cm; the diameter of the throat 6 is 4 cm; the diameter of the discharge opening 20 is 2 cm; the inner diameter of the upper electrode 4 is 15 cm; the inner diameter of the lower electrode 5 is 60 cm (the inner diameter of the lower portion of the furnace is about 60 cm); the height of the upper and lower electrodes is 10 cm each; the distance between the charging opening 2 and the throat 6 is 25 cm; the distance between the throat 6 and the lower electrode 5 is 30 cm, and the distance between the lower electrode 5 and the discharge opening 20 is 25 cm.

When the method of this invention is carried out a water seal layer is automatically formed in the upper portion of layer a which acts as a drying zone so that it is possible to use a portion of the moisture contained in the activated carbon to generate steam necessary for regenerating the activated carbon after the portion has been evaporated and passed through heated layers. As a consequence, offensive odored gases generated by the decomposition of the impurities adsorbed by the activated carbon are decomposed into odorless substances while they pass through the high temperature heating zone so that it is not necessary to use any special deodorizer.

The reason that why a water seal layer is formed in the upper portion of the drying zone is not yet fully understood, but it is presumed that the evaporated moisture condenses by being cooled by not yet heated layer of the activated carbon and the condensate is retained by the particles of the activated carbon by surface tension. If the quantity of moisture contained by the activated carbon were excessive it would be possible to discharge the moisture or steam to the outside by providing a vent pipe.

In one example, the method of this invention was applied to the regeneration of active carbon used to purify colored waste water. The used activated carbon was charged into an electric furnace of the type shown in FIG. 1 at a rate of 1.5 kg/hour and a voltage of 200 V (DC or AC) was impressed across electrodes 4 and 5. Under a steady state, current of 15 A flowed and the temperature at the center of the third or regeneration layer c reached 850° C. which is sufficient to regenerate the used activated carbon.

The relationship between the temperature of the activated carbon and variation in the electrical resistance of this example is shown in FIG. 2. From FIG. 2 it can be clearly noted that during the first step the resistance is low and substantially constant showing that moisture is evaporated off, that between 100° and 200° C. the resistance is high showing that such high resistance is caused by the dehydrated impurity, that between 200° C. and 500° C. the resistance decreases gradually showing that the impurity is decomposed and carbonized and that between about 600° C. and 900° C. the resistance is substantially constant showing that regeneration is performed as desired.

As shown by the following table, the activity of the activated carbon regenerated by the process just described has been recovered to about 90% of that of the fresh activated carbon.

Methylene Blue Adsorption Ability (mg/g)
Fresh activated carbon 230
Used activated carbon 52
Regenerated activated carbon 210

What is claimed is:

1. Apparatus for regenerating used activated carbon comprising a vertical electric furnace provided with an upper opening for charging used activated carbon to be generated, a bottom opening for discharging regenerated activated carbon, upper and lower generally annular electrodes mounted on the inner wall of said electric furnace said electrodes being spaced apart in the vertical direction, a horizontal plate located below said lower electrode and provided with slots for passing regenerated activated carbon, cooling tubes located beneath said slots and on the opposite sides of said slots for defining passages for regenerated activated carbon, and rotary discharge means located below said passages respectively, the inner cross-sectional area of said furnace gradually decreasing and then gradually increasing between said upper and lower electrodes thus forming a passage of said activated carbon, and a source of electric power for applying operating voltage across said electrodes.

2. The apparatus according to claim 1 which further comprises steam ejecting means opened in said electric furnace beneath said throat.

* * * * *